United States Patent [19]

Musser et al.

[11] Patent Number: 4,524,165
[45] Date of Patent: Jun. 18, 1985

[54] STABILIZED COPOLYESTERETHER COMPOSITIONS SUITABLE FOR OUTDOOR APPLICATIONS

[75] Inventors: Harry R. Musser; Thomas H. Strickland; Joseph S. Zannucci, all of Kingsport, Tenn.

[73] Assignee: Eastman Kodak Company, Rochester, N.Y.

[21] Appl. No.: 544,035

[22] Filed: Oct. 24, 1983

[51] Int. Cl.$^3$ .............. C08K 5/34; C08K 5/07; C08K 5/10
[52] U.S. Cl. .................. 524/99; 524/101; 524/102; 524/103; 524/208; 524/220; 524/222; 524/259; 524/291; 524/335; 524/336; 524/337; 524/338; 524/537; 525/437; 525/448
[58] Field of Search ............ 524/99, 101, 102, 103, 524/208, 220, 222, 259, 291, 335, 336, 337, 338, 357; 528/272, 302, 307; 525/437, 448

[56] References Cited

U.S. PATENT DOCUMENTS

| | | | |
|---|---|---|---|
| 3,529,982 | 9/1970 | Luethi et al. | 524/220 |
| 4,153,597 | 5/1979 | Wheeler et al. | 524/259 |
| 4,185,003 | 1/1980 | Hoeschele | 524/222 |
| 4,256,860 | 3/1981 | Davis et al. | 528/272 |
| 4,278,590 | 4/1981 | Dexter et al. | 524/100 |
| 4,349,469 | 9/1982 | Davis et al. | 528/296 |

Primary Examiner—John Kight
Assistant Examiner—Kriellion Morgan
Attorney, Agent, or Firm—Clyde L. Tootle; Gary C. Bailey; D. B. Reece, III

[57] ABSTRACT

Disclosed are stabilized polyester compositions having significantly improved weatherability. These polyesters consist of copolyesterethers derived from a dicarboxylic acid component comprising about 80–100 mole % 1,4-cyclohexanedicarboxylic acid having a trans isomer content of at least 70% and about 0–20 mole % of a second dicarboxylic acid and a glycol component comprising about 70–95 mole % 1,4-cyclohexanedimethanol and about 5–30 mole % of a polyalkylene ether glycol having a molecular weight of about 600 to about 3000. The copolyesterether compositions further comprise a stabilizing effective amount of the combination of (1) at least one hindered phenolic antioxidant, (2) at least one ultraviolet light stabilizing compound compatible with said copolyesterether and (3) at least one hindered amine light stabilizing compound having the formulae

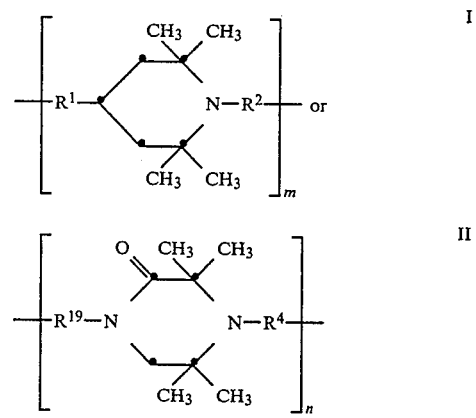

the groups shown as $R^1$, $R^2$, $R^3$ and $R^4$ are each independently selected from various substituents.

27 Claims, No Drawings

STABILIZED COPOLYESTERETHER COMPOSITIONS SUITABLE FOR OUTDOOR APPLICATIONS

DESCRIPTION

BACKGROUND OF THE INVENTION

This invention relates to a stabilizer system for copolyesterethers and their commercially useful stabilized compositions which provide finished products having improved weatherability.

Polyesters of various compositions have been used extensively to prepare film, sheets and various molded, shaped or formed articles. In order for these various articles to be successfully used in outdoor applications they must retain their appearance, particularly with respect to gloss, transparency and shape and a reasonable amount of physical properties, i.e., impact strength, tensile properties, etc. Many of such articles, however, tend to degrade and the physical properties of the articles are reduced when exposed to outdoor conditions (e.g., ultraviolet light, heat, water and oxygen) over an extended period of time, thus rendering such articles less useful for most outdoor applications. Therefore, considerable effort has been directed to improving the weatherability of such polymeric compositions.

Generally the existing stabilizers and stabilizer combinations have not been effective in preventing surface degradation of polyester compositions for periods of time sufficient for outdoor applications. It is generally thought that a plastic suitable for outdoor use will have good retention of physical and appearance properties for at least 2000-3000 hours exposure in an accelerated weathering device such as an Atlas XWR Weather-Ometer ®. However, obtaining a polyester suitable for outdoor use—that is, polyesters which retain both the desired physical properties and appearance properties after long term outdoor exposure—has heretofore not been possible. Typically, articles formulated from polyester compositions stabilized with known stabilizers and stabilizer combinations retain the desired appearance and/or physical properties generally for less than 1000 hours exposure in an accelerated weathering device. Upon exposure for longer periods such polyester articles rapidly lose the desired appearance properties, i.e. becoming hazy, dull and often misshapen, and/or key physical properties, i.e. becoming brittle.

It has unexpectedly been found that certain copolyesterethers, when stabilized with the combination of certain antioxidants, ultraviolet light (UV) stabilizers, and hindered amine light stabilizers (HALS), can withstand significantly longer periods of exposure under accelerated weathering conditions with good retention of both appearance properties (gloss, transparency, shape) and physical properties (impact and tensile strength) than has previously been possible. It will be readily apparent to those skilled in the art that copolyesterethers having such dramatically increased weatherability will be especially suitable for use in many outdoor applications.

SUMMARY OF THE INVENTION

According to the present invention highly weatherable copolyesterether compositions having a 264 psi heat deflection temperature greater than 60° C. and an inherent viscosity of about 0.8 to about 1.5 are provided. Copolyesterethers of this invention are derived from:

A. a 100 mole % dicarboxylic acid component comprising about 80-100 mole % 1,4-cyclohexanedicarboxylic acid having a trans isomer content of at least 70% and about 0-20 mole % of a second acid selected from the group consisting of aliphatic dicarboxylic acids having 3 to 12 carbon atoms, B. a 100 mole % glycol component comprising about 70-95 mole % 1,4-cyclohexanedimethanol and about 5-30 mole % of a polyalkylene ether glycol having a molecular weight of about 600 to about 3000, and C. a stabilizing effective amount of the combination of 1. at least one hindered phenolic antioxidant,
2. at least one ultraviolet light stabilizing compound compatible with said copolyesterether, and
3. at least one hindered amine light stabilizing compound having the formulae

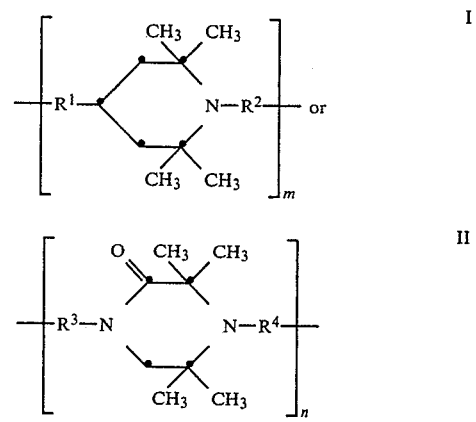

wherein m and n ar each integers of from 1 to 20, $R^1$, $R^2$, $R^3$ and $R^4$ are each independently selected from hydrogen, substituted or unsubstituted alkyl having 1 to 20 carbon atoms, aryl having 6 to 22 carbon atoms, alkylene having 1 to 20 carbon atoms, cycloalkylene having 3 to 12 carbon atoms, hydroxyalkyl having 1 to 18 carbon atoms, and esters of said hydroxyalkyl; and alkylenecarboxylic acid having 2 to 18 carbon atoms and esters, amides and metal salts of said alkylenecarboxylic acid.

DETAILED DESCRIPTION OF THE INVENTION

The copolyesterethers of this invention may be prepared according to procedures well known in the art. For example, see U.S. Pat. No. 3,023,192; 3,013,914 and 3,763,109. These copolyesterethers are an improvement over the prior art in that they have a good retention of both appearance properties, such as surface gloss, transparency and shape, as well as physical properties, such as impact and tensile strength, after long periods of exposure (more than 3000 hours) under accelerated weathering conditions. They are therefore particularly well suited for various outdoor applications where degradation by ultraviolet light, heat, water and oxygen is commonly encountered.

The copolyesterethers of this invention are derived from (1) an acid component comprising 1,4-cyclohexanedicarboxylic acid and optionally a second dicarboxylic acid containing 3-12 carbon atoms, (2) a glycol component comprising 1,4-cyclohexanedimethanol, a polyalkylene ether glycol and optionally a third glycol selected from the group consisting of aliphatic glycols having 2-12 carbon atoms, and (3) a stabilizing effective amount of the combination of (a) at least one phenolic antioxidant, (b) at least one UV stabilizer and (c) at least one hindered amine light stabilizing compound.

The acid component contains about 80–100 mole % 1,4-cyclohexanedicarboxylic acid. The acid component also comprises about 0–20 mole % of a second dicarboxylic acid having 3–12 carbon atoms, the second acid preferably being an aliphatic dicarboxylic acid. Such typical acids include adipic acid, sebacic acid, glutaric acid, azelaic acid and the like. Preferably 1,4-cyclohexanedicarboxylic acid has a trans isomer content of at least about 70% up to 100% and especially preferred is about 85 to about 95% trans.

The glycol component contains about 70–95 mole % of 1,4-cyclohexanedimethanol and preferably about 85–95 mole %. The glycol component also contains about 5–30 mole % of a polyalkylene ether glycol and preferably about 5–15 mole %, said glycol having a molecular weight of about 600 to about 3,000 and preferably from about 800 to about 1200. It is also preferred that 1,4-cyclohexanedimethanol have a high trans isomer content, for example, at least 60%.

The physical characteristics of the copolyester-ethers according to this invention require that the glycol component be a mixture of 1,4-cyclohexanedimethanol and at least one polyalkylene ether glycol of the molecular weight previously described.

The polyalkylene ether glycols employed in the copolyesterethers of this invention have the structure H—(OCH$_2$—R)$_n$—OH wherein R is a lower alkylene group and n is an integer of from 2 to 20. Typical polyalkylene ether glycols include polyethylene ether glycol, polypropylene ether glycol and polytetramethylene ether glycol.

The glycol component may additionally be modified with other conventional glycols, previously referred to herein as a "third glycol." Examples of other glycols which may be used as a third glycol are ethylene glycol, diethylene glycol, 1,4-butanediol, 1,6-hexanediol, and the like. One or more of these glycols may be employed in amounts up to about 20 mole % and preferably up to about 10 mole % based on a total glycol content of 100 mole %.

Each of the acids and glycols identified above are commercially available, or they may be prepared by well known procedures.

The copolyesterethers of this invention have an ASTM (D648-56) 264 psi heat deflection temperature greater than 60° C. The copolyesterethers also have an inherent viscosity of at least about 0.8 and preferably from about 0.8 to 1.5 when measured at 25° C. using 0.5 grams of polymer per 100 ml of a solvent composed of 60/40 (wt/wt) phenol/tetrachloroethane.

The copolyesterethers of this invention have significantly improved weatherability when the combination of antioxidant, UV stabilizer, and hindered amine stabilizer as described herein are incorporated into said copolyesterethers in a stabilizing effective amount. Thus, the physical characteristics of these copolyesterethers require that at least one phenolic antioxidant, at least one ultraviolet light stabilizer and at least one hindered amine light stabilizer be incorporated into said copolyesterethers.

The stabilizing combination found particularly advantageous for these copolyesterethers is the combination of (1) about 0.01 to about 1.0 weight percent of at least one hindered phenolic antioxidant, (2) about 0.05 to about 5.0 weight percent of at least one UV stabilizing compound compatible with said copolyesterether and (3) about 0.05 to about 2.0 weight percent of at least one HALS compound of formulae I or II, all weights based on the weight of the copolyesterether material to which they are added. For economic reasons the copolyesterethers are preferably stabilized with about 0.1 to about 0.5 weight percent of said antioxidants, about 0.5 to about 1.0 weight percent of said UV stabilizers, and about 0.25 to about 0.5 weight percent of said HALS.

The phenolic antioxidants employed in the copolyesterethers of this invention are those typically used in the stabilization of polyolefins. It is preferred that the phenolic antioxidant be hindered and relatively nonvolatile. Examples of suitable hindered phenol antioxidants include 1,3,5-tris(3,5-di-tert-butyl-4-hydroxybenzyl)-s-triazine-2,4,6-(1H, 3H, 5H)-trione; 3,5-di-tert-butyl-4-hydroxyhydrocinnamic acid triester with 1,3,5-tris-(2-hydroxyethyl)-s-triazine-2,4,6-(1H, 3H, 5H)-trione; O,O-di-n-octadecyl-3,5-di-tert-butyl-4-hydroxybenzyl phosphonate; octadecyl 3,5-di-tert-butyl-4-hydroxyhydrocinnamate; thiodiethylene bis(3,5-di-tert-butyl-4-hydroxy)hydrocinnamate; N,N'-hexamethylene-bis(3,5-di-tert-butyl-4-hydroxyhydrocinnamamide); 1,6-hexamethylene-bis(3,5-di-tert-butyl-4-hydroxyhydrocinnamate); 1,3,5-trimethyl-2,4,6-tris-(3,5-di-tert-butyl-4-hydroxybenzyl)benzene; 2,4-bis-(n-octylthio)-6-(4-hydroxy-3,5-di-tert-butylanilino)-1,3,5-triazine; n-octadecyl 3,5-di-tert-butyl-4-hydroxyphenylacetate; 1,3,5-tris-(4-tert-butyl-3-hydroxy-2,6-dimethylbenzyl)-1,3,5-triazine-2,4,6-(1H, 3H, 5H)-trione; 2,2'-methylenebis(4-ethyl-6-tert-butyl-phenol); 4,4'-methylenebis(2,6-di-tert-butylphenol); 4,4'-thiobis(6-tert-butyl-2-methylphenol); 3:1 condensate of 3-methyl-6-tert-butylphenol and crotonaldehyde; 4,4'-butylidenebis(6-tert-butyl-m-cresol)-3,5-di-tert-butyl-4-hydroxybenzyl ether; 2,2'-oxamido-bis-[ethyl-3(3,5-di-tert-butyl-4-hydroxy]phenyl)-propionate; stearyl β-(3,5-di-tert-butyl-4-hydroxyphenol)propionate; distearyl 3-methyl-4-hydroxy-5-tert-butylbenzyl malonate; 4,4'-propylmethylene-bis(2-tert-butyl-5-methylphenol); 2,2'-propylmethylenebis(4,6-di-methylphenol); 2,2'-methylene-bis(4,6-di-tert-butylphenol); 1,4-bis(3',5'-di-tert-butyl-4'-hydroxybenzyl)-2,3,5,6-tetramethylbenzene; 1,1-bis-(3'-cyclohexyl-4'-hydroxyphenyl)cyclohexane; 2,6-bis-(2'-hydroxy-3'-tert-butyl-5'-methylphenyl)-4-methylphenol; 2,4,6-tris-[β-(3',5'-di-butyl-4'-hydroxyphenyl)ethyl]-1,3,5-triazine; 2,4,6-tris(3',5'-di-tert-butyl-4'-hydroxybenzyl)phenol; and pentaerythritol tetrakis(3,5-di-tert-butyl-4-hydroxyhydrocinnamate) which is commercially available from Geigy Chemical Company as Irganox 1010 antioxidant.

The ultraviolet light stabilizers useful in the present invention are the ultraviolet light stabilizing compounds which ordinarily are compatible with polyesters in general. Preferred are those having the following formulae:

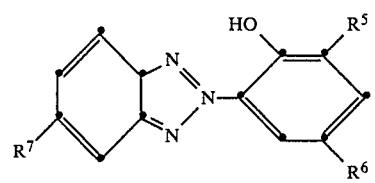

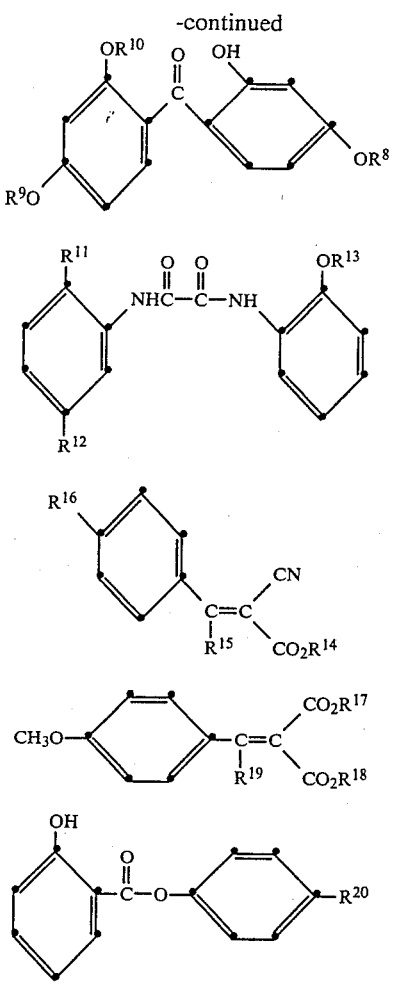

zophenone (IV), oxanilides (V), esters of acrylic acid (VI), esters of malonic acid (VII), and aromatic esters of salicylic acid (VIII).

Examples of 2-hydroxybenzotriazoles useful in the present invention include: 2-(2'-hydroxy-5'-methylphenyl)benzotriazole; 2-(2'-hydroxy-3',5'-di-tert-butylphenyl)benzotriazole; 2-(2'-hydroxy-3',5'-di-tert-butylphenyl)-5-chlorobenzotriazole; 2-(2'-hydroxy-3',5'-di-tert-amylphenyl)benzotriazole; 2-(2'-hydroxy-3'-tert-butyl-5'-methylphenyl)-5-chlorobenzotriazole; 2-(2'-hydroxy-5'-tert-butylphenyl)benzotriazole; 2-(2'-hydroxy-3'-sec-butyl-5'-tert-butylphenyl)benzotriazole; 2-(2'-hydroxy-5-tert-octylphenyl)benzotriazole; 2-(2H-benzotriazol-2-yl)-4,6-bis(1-methyl-1-phenylethyl)-phenol; and the like.

Examples of 2-hydroxybenzophenones useful in the present invention include 2,4-dihydroxybenzophenone; 2-hydroxy-4-methoxybenzophenone; 2-hydroxy-4-tert-butoxybenzophenone; 2-hydroxy-4-octoxybenzophenone; 2-hydroxy-4-dodecyloxybenzophenone; 2-hydroxy-4-stearoxybenzophenone; 2-hydroxy-4-phenoxybenzophenone; 2-hydroxy-4-(β-hydroxyethoxy)benzophenone; 2-hydroxy-4-(2'-hydroxy-3'-acryloxypropoxy)benzophenone; 2-hydroxy-4-(2'-hydroxy-3'-methacryloxypropoxy)benzophenone; 2,2'-dihydroxybenzophenone; 2,2'-dihydroxy-4-methoxybenzophenone; 2,2'-di-hydroxy-4-butoxybenzophenone; 2,2'-dihydroxy-4-octoxybenzophenone; 2,2'-dihydroxy-4-lauroxybenzophenone; 2,2',4,4'-tetrahydroxybenzophenone; 2,2',4'-trihydroxy-4-methoxybenzophenone; 2-hydroxy-4-methoxy-4'-chlorobenzophenone; 2,2'-dihydroxy-4,4'-dimethoxybenzophenone; 2-hydroxy-4-methoxy-2'-methyl-4'-hydroxybenzophenone; 2-hydroxy-4-methoxy-4'-tert-butylbenzophenone; 2-hydroxy-4-methoxy-4'-methy-benzophenone; 2-hydroxy-4,4'-dimethoxybenzophenone; 2-hydroxy-4,4',2'-trimethoxybenzophenone; and the like.

Examples of oxanilides useful in the present invention include 2-ethoxy-2'-ethyloxanilide; 5-tert-butyl-2-ethoxy-2'-ethyloxanilide, and the like.

Examples of acrylic acid esters useful in the present invention include 2-ethylhexyl-2-cyano-3,3-diphenyl acrylate; 2-ethyl-2-cyano-3,3-diphenyl acrylate; butyl-2-cyano-3-methyl-3-(p-methoxyphenyl)acrylate; methyl-2-cyano-3-methyl-3-(p-methoxyphenyl)acrylate; and the like.

Examples of malonic acid esters useful in the present invention include the dimethyl and diethyl esters, p-methoxybenzylidine malonic acid; methyl-2-carbomethoxy-3-(p-methoxyphenyl)acrylate; and the like.

Examples of salicylic acid esters useful in the present invention include p-tert-octylphenyl salicylate; phenyl salicylate; carboxyphenyl salicylate; methylphenyl salicylate; 4-tert-butylphenyl salicylate; and the like.

Some of the various UV stabilizers suitable for the copolyesterethers of this invention which are commercially available include Tinuvin ®P, Tinuvin ®326 and Tinuvin ®144 manufactured by Ciba-Geigy Corporation, Ardsley, N.Y.; Cyasorb ® UV-531, Cyasorb ® UV-1988 and Cyasorb ® UV-5411 manufactured by American Cyanamid Company, Bound Brook, N.J.; and Sanduvor VSU manufactured by Sandoz Corporation, East Hanover, N.J.

The hindered amine light stabilizers (HALS) of this invention are based on the cyclic hindered amine compounds. Examples of these include 1,1'-[1,2-ethanediyl]-bis[3,3,5,5-tetramethylpiperazinone]; dimethylsuccinate In the above formulae, $R^5$, $R^6$, and $R^7$ are each independently selected from hydrogen, hydroxyl, branched or unbranched, substituted or unsubstituted alkyl or alkoxy radicals containing from 1 to 18 carbon atoms, aryl, and alkylenearyl containing from 7 to 22 carbon atoms; $R^7$ may additionally be chlorine or fluorine;

$R^8$, $R^9$ and $R^{10}$ are each independently selected from hydrogen, branched or unbranched, substituted or unsubstituted alkyl having 1 to 18 carbon atoms, and alkylenecarbonyloxyalkyl having 3 to 18 carbon atoms;

$R^{11}$, $^{12}$ and $R^{13}$ are each independently selected from hydrogen and substituted or unsubstituted, branched or unbranched alkyl radicals containing from 1 to 10 carbon atoms;

$R^{14}$ and $R^{16}$ are each independently selected from substituted or unsubstituted alkyl containing from 1 to 18 carbon atoms, $R^{15}$ is hydrogen, methyl, or substituted or unsubstituted aryl having 6 to 22 carbon atoms, and $R^{16}$ is also substituted or unsubstituted alkoxy having 1 to 18 carbon atoms;

$R^{17}$ and $R^{18}$ are each independently selected from substituted or unsubstituted, branched or unbranched alkyl having 1 to 18 carbon atoms and $R^{19}$ is hydrogen or methyl;

$R^{20}$ is hydrogen, substituted or unsubstituted branched or unbranched alkyl or alkoxy having 1 to 18 carbon atoms.

The UV stabilizers of formulae III through VIII useful in the copolyesterethers of this invention are based on 2-hydroxybenzotriazole (III), 2-hydroxybenpolymer with 4-hydroxy-2,2,6,6-tetramethyl-1-piperdineethanol; bis(1,2,2,6,6-pentamethyl-4-piperidinyl)-sebacate; bis(2,2,6,6-tetramethyl-4-piperidinyl)decanedioate; bis(1,2,2,6,6-pentamethyl-4-piperidinyl)-2-[[3,5-bis(1,1-dimethylethyl)-4-hydroxyphenyl]methyl]-2-butylpropanedioate; poly[(2,2,6,6-tetramethyl-4-piperidinyl)iminomethylene-(2,2,6,6-tetramethyl-4-piperidinyl)imino[6(octylamino)1,3,5-triazine-4,2-diyl]]; 2,2,6,6-tetramethyl-4-piperidinyl benzoate; tetrakis(2,2,6,6-tetramethyl-4-piperidinyloxy)silane; and the like. Various HALS suitable for the copolyesterethers of this invention are available commercially including Tinuvin ®292, Tinuvin ®622 and Tinuvin ®770 all of which are manufactured by Ciba-Geigy Corporation, Ardsley, N.Y.

The copolyesterethers of this invention may be modified with suitable branching agents where desirable to increase the melt strength of the polymeric material and thus allowing for its use in extrusion blow molding operations. The amount of branching agent generally suitable is from about 0.01 mole % to about 1.5 mole % based on the acid or glycol component. Examples of suitable branching agents are trimellitic acid or anhydride, trimethylol propane, trimesic acid and the like.

It should be understood that the total acid reactants should be 100 mole % and the total glycol reactants should be 100 mole %. Thus, if a branching agent is employed it will be calculated as a part of the 100 mole % acid or 100 mole % glycol.

The copolyesterethers of this invention may also contain other additives including pigments, colorants, mold releasing agents, and fillers as well as phosphite stabilizers such as distearyl pentaerythritol diphosphite, diisooctyl phosphite, distearyl phosphite, triphenyl phosphite, diphenyl isodecyl phosphite, and distearyl pentaerythritol diphosphite manufactured by Borg Warner Corporation, Parkersburg, W. Va.

In the context of UV stabilizers and HALS having formulae I through VIII as defined herein the terms alkylene, cycloalkylene, alkylenecarboxylic acid, alkylenearyl and alkylenecarbonyloxyalkyl are meant to identify divalent organic radicals.

Ester-forming derivatives of the acids referred to herein can be employed, if desired, to prepare the copolyesterethers of this invention. Examples of such ester-forming derivatives are the anhydrides, esters and ester chlorides of such acids.

Further there is provided in accordance with this invention a method of stabilizing copolyesterethers derived from (1) an acid component comprising 1,4-cyclohexanedicarboxylic acid and optionally an aliphatic dicarboxylic acid and (2) a glycol component comprising 1,4-cyclohexanedimethanol, a polyalkylene ether glycol and optionally a third glycol. Thus, copolyesterethers derived from said acid component and said glycol component are stabilized by the method comprising the step of incorporating into said copolyesterether composition a stabilizing amount of the combination of (1) at least one hindered phenolic antioxidant, (2) at least one ultraviolet light stabilizing compound which is compatible with said copolyesterether, and (3) at least one hindered amine light stabilizing compound having formulae I or II previously defined herein.

The phenolic antioxidants, UV stabilizers and HALS may be incorporated into the copolyesterethers of this invention by methods known in the art, such as by melt blending or adding onto the surface of the copolyesterether material prior to formulating it into the desired shaped article.

The stabilized copolyesterethers of this invention may be formulated into articles of various forms by methods such as extrusion, extrusion blow molding, and injection molding well known in the art.

The following examples are given to further illustrate the invention, but it is to be understood that the invention is not to be limited in any way by the details described therein.

EXAMPE 1

This example illustrates the preparation of the polymer of 99.5 mol % 1,4-cyclohexanedicarboxylic acid (95% trans isomer), 0.5 mol % trimellitic anhydride, 91.1 mole % 1,4-cyclohexanedimethanol (70% trans), and 8.9 mol % poly(oxytetramethylene glycol) (mw 1,000).

Preparation of Copolester Ether. To a 500 ml round-bottom flask fitted with a stirrer, nitrogen inlet, vacuum adaptor port, were charged 83.1 g (0.4155 moles) t-dimethylcyclohexane dicarboxylate, 0.4 g (0.002 moles) trimellitic anhydride, 56.0 g (0.39 moles) cyclohexanedimethanol, 37.5 g (0.0375 moles) of polyoxytetramethyleneglycol) mw of 1,000, and 0.3 g of Irganox ® 1010. One hundred parts per million of titanium from titanium isopropoxide were added as catalyst.

The reaction mixture was stirred, under nitrogen, at 220° C. for one hour during which time methanol, from ester interchange reaction, evolved. The reaction temperature was then raised to 270° C., nitrogen flow terminated, and a vacuum of 0.5–0.1 mm of pressure was maintained. The molecular weight of the copolyesterether increased as evidenced by an increase in viscosity. After approximately 40 minutes the vacuum was released, the polymer exposed to a nitrogen atmosphere, and cooled to room temperature. Upon removal from the flask the polymer exhibited a crystalline melting point of approximately 215° C. and had an inherent viscosity of about 1.20–1.30.

EXAMPLE 2

This example illustrates the procedure used to prepare weather stabilized polyester formulations.

The polyester from Example 1 was ground to pass a 3-mm screen and dried overnight at 70° C. in a vacuum oven. To 195.6 g of the polyesterether was added 2 g of Cyasorb ® UV-5411, 1.0 g of Weston ®618, 0.4 g of Irganox ®1010, and 1 g of Tinuvin ®770. This mixture was dry blended until uniform and then extruded into 5-mil thick film in a Brabender ® extruder (C. W. Brabender, Hackensack, N.J.). The film was cut into 0.5-in.×2.5-in. strips and exposed in an Atlas XWR Weather-Ometer according to ASTM Standard G23. Embrittlement was measured by creasing the films once a week.

EXAMPLES 3–15

Thirteen different terephthalic acid based polyesters were prepared using a procedure similar to that described in Example 1. The same stabilizer formulation was employed in each [Tinuvin ® P ultraviolet light stabilizer (1.0 wt %) and Weston ®618 antioxidant (0.5%)]. Each was extruded into 5-mil thick film as in Example 2 and exposed in an Atlas XWR Weather-Ometer. The weatherability of each was determined by the number of hours to develop surface haze. The results are shown in Table I. Each of the terephthalic acid based polyesters developed surface haze in less than 1,500 hours.

TABLE I

| No. | Polymer[a,b] | Hours to Develop Surface Haze |
|---|---|---|
| 3 | T(100)-EG(100) | <1000 |
| 4 | T(100)-NG(100) | <1500 |
| 5 | T(100)-BO(100) | <1000 |
| 6 | T(100)-CM(100) | <1000 |
| 7 | T(100)-CM(80)-TC(20) | <1500 |
| 8 | T(100)-EG(25)-CM(75) | <1000 |
| 9 | T(75)-S(25)-CM(100) | <1000 |
| 10 | T(100)-TC(80)-BO(20) | <1000 |
| 11 | T(100)-NG(90)-BO(10) | <1000 |
| 12 | T(100)-NG(90)-PTG(10) | <1500 |
| 13 | T(75)-S(25)-CM(100) | <1000 |
| 14 | T(100)-CM(60)-TC(20)-BO(20) | <1000 |
| 15 | T(100)-CM(80)-NG(20) | <1000 |

[a]Polyesters were stabilized with a mixture of 1.0 wt % Tinuvin P ultraviolet light stabilizer [2-(2'-hydroxy-5'-methylphenyl)benzotriazole] and 0.5 wt % of Weston 618 antioxidant [distearyl pentaerythritol diphosphite]
[b]T = terephthalic acid; EG = ethylene glycol;
NG = neopentyl glycol; BO = 1,4-butanediol;
CM = 1,4-cyclohexanedimethanol (70% trans)
TC = 2,2,4,4-tetramethylene-1,3-cyclobutanediol (67% trans)
PTG = poly(tetramethylene ether glycol)
S = p,p'-sulfonyldibenzoic acid
The numbers in parentheses following the polymer code indicate the mole percent of monomer in each polymer

EXAMPLES 16-26

Eleven polyesters based on the same terephthalic acid based polyester [terephthalic acid (100 mole %) and neopentylglycol (100 mole %)] were prepared using a procedure similar to that described in Example 1. Each was stabilized with different stabilizer formulations with the exception of Example 16 which contained no stabilizers. Each was molded into 5-mil thick film as in Example 2 and exposed in an Atlas XWR Weather-Ometer. The weatherability of each was determined by the number of hours to develop surface haze. The results are shown in Table II. Each of the polyesters developed surface haze in less than 1,500 hours.

TABLE II

| No. | Stabilizer Formulation[c] | Hours to Develop Surface Haze |
|---|---|---|
| 16 | None | <1500 |
| 17 | Tinuvin ® P (1.0%) Weston ® 618 (0.25%) | <1500 |
| 18 | Cyasorb ® UV-531 | <1500 |
| 19 | Tinuvin ® 622 (0.5%) | <1500 |
| 20 | Sanduvor ® VSU (1%) | <1500 |
| 21 | Sanduvor ® VSU (1%) Tinuvin ® 622 (0.5%) | <1500 |
| 22 | Sanduvor ® VSU (1%) Tinuvin ® 622 (0.5%) Cyasorb ® UV-1988 (0.5%) Irgastab ® 2002 (0.5%) | <1500 |
| 23 | Sanduvor ® VSU (0.5%) Tinuvin ® 622 (0.5%) Cyasorb ® UV-5411 (0.5%) Weston ® 618 (0.5%) | <1500 |
| 24 | Cyasorb ® UV-5411 (1.0%) Tinuvin ® 144 (0.5%) Weston ® 618 (0.5%) | <1500 |
| 25 | Cyasorb ® UV-5411 (1.0%) Tinuvin ® 144 (0.5%) Weston ® 618 (0.5%) Cyasorb ® UV-1988 (1.0%) | <1500 |
| 26 | Cyasorb ® UV-5411 (1.0%) Tinuvin ® 144 (0.5%) Weston ® 618 (0.5%) Irganox ® 1010 (.25%) | <1500 |

[c]Tinuvin ® 144 [UV stabilizer (Di(1,2,6,6-pentamethyl-4-piperidinyl)-butyl(3',5'-ditert-butyl-4-hydroxybenzyl)malonate]
Tinuvin ® 622 [hindered amine stabilizer (a polyester of succinic acid and N—β-hydroxyethyl-2,2,6,6-tetramethyl-4-hydroxy-piperidine)]
Tinuvin ® P [UV stabilizer (2-(2'-hydroxy-5'-methylphenyl)benzotriazole)]
Weston ® 618 [phosphite antioxidant (distearyl pentaerythritol diphosphite)]
Cyasorb ® UV-531 [UV stabilizer (2-Hydroxy-4-octoxybenzophenone]
Cyasorb ® UV-1988 [UV stabilizer (Methyl-2-carboxymethyl-3-(4'-methoxyphenyl)acrylate]
Cyasorb ® UV-5411 [UV stabilizer (2-2'-hydroxy-5-tert-octylphenyl)-benzotriazole]
Sanduvor ® VSU [UV stabilizer (2-ethoxy-2'-ethyloxanilide)]
Irgastab ® 2002 [Nickel bis((ethyl-(3,5-di-tert-butyl-4-hydroxybenzyl)phosphonate)]
Irganox ® 1010 [hindered phenolic antioxidant (pentaerythritoltetrakis(3,5-di-tert-butyl-4-hydroxyhydrocinnamate)]

EXAMPLES 27-30

Four different copolymers were prepared based on four different combinations of terephthalic acid and aliphatic dicarboxylic acids using a procedure similar to that described in Example 1. Each was stabilized with the formulations shown, molded into 5-mil thick film as in Example 2 and exposed in an Atlas XWR Weather-Ometer. The weatherability of each was determined by the number of hours to develop surface haze. The results are shown in Table III. Each of the copolymers developed surface haze is less than 1000 hours.

TABLE III

| No. | Polymer[d] | Stabilizer Formulation[e] | Hours to Develop Surface Haze |
|---|---|---|---|
| 27 | T(80)-C(20)-NG(100) | Cyasorb UV-1988 (1.0%) | <1000 |
| 28 | T(90)-A(10)-NG(100) | Irganox 1010 (.2%) Cyasorb UV-5411 (1.0%) Weston 618 (0.5%) | <1000 |
| 29 | T(80)-A(20)-NG(100) | Cyasorb UV-5411 (1.0%) Weston 618 (0.5%) | <1000 |
| 30 | T(60)-C(40)-CM(100) | Cyasorb UV-5411 (1.0%) Irganox 1010 (0.1%) Weston 618 (.25%) | <1000 |

[d]C = 1,4-cyclohexanedicarboxylic acid (100% trans); A = adipic acid; see footnote b of Table I for monomer code definitions.
[e]See footnote c of Table II for stabilizer information.

EXAMPLES 31-34

Four copolyesterethers were prepared using a procedure similar to that described in Example 1. Each was derived from 1,4-cyclohexanedicarboxylic acid, 1,4-cyclohexanedimethanol and selected poly(alkyleneether glycols). The same stabilizer formulation was employed in each [Irganox 1010 (1.0%), Weston 618 (0.5%) and Cyasorb UV-5411 (1.0%)]. Each copolymer was extruded into 5-mil thick film as in Example 2 and exposed in an Atlas XWR Weather-Ometer. The weatherability of each was determined by the number of hours to develop surface haze. The results are shown in Table IV. In each example more than 3000 hours exposure were required before surface haze developed.

TABLE IV

| No. | Polymer[f] | Hours to Develop Surface Haze |
|---|---|---|
| 31 | C(99.5)-M(.5)-CM((91.1)-PTG(8.9) | >3000 |
| 32 | C(100)-CM(97.1)-PTG(2.4) | >3000 |
| 33 | C(100)-CM(98.4)-PTG(1.6) | >3000 |
| 34 | C(100)-CM(97.6)-PEG(2.4) | >3000 |

[f]M = trimellitic anhydride (branching agent)
PTG = polytetramethylene ether glycol (1000 mw)
PEG = polyethylene ether glycol (1000 mw)

EXAMPLES 35-50

Seventeen polyesters of various composition were prepared using a procedure similar to that described in Example 1. Various stabilizer formulations were used in each with the exception of Examples 44 and 48 which contained no stabilizers. Each was molded into 5-mil thick film as in Example 2 and exposed in an Atlas XWR Weather-Ometer. The weatherability of each was determined by the number of hours to develop embrittlement. The results are shown in Table V. Examples 39, 40, 42 and 43, which were made according to the copolyesterethers of this invention, exhibited significantly better weatherability than the examples in which different polyesters and/or stabilizer formulations were employed.

TABLE V

| No. | Polymer[g] | Stabilizer Formulation[h] | Hours to Embrittlement |
|---|---|---|---|
| 35 | C(99.5)-M(.5)-CM((91.1)-PTG(8.9) | Irganox 1010 (.3%) | <200 |
| 36 | " | Weston 618 (.5%) Irganox 1010 (0.2%) | <200 |
| 37 | " | Irganox 1010 (.5%) Weston 618 (.5%) | <200 |
| 38 | " | Cyasorb UV-5411 (1%) Weston 618 (.5%) Irganox 1010 (0.2%) | 1700 |
| 39 | " | Cyasorb UV-5411 (1%) Weston 618 (.5%) Tinuvin 770 (.5%) Irganox 1010 (0.2%) | 6500 |
| 40 | " | Cyasorb UV-5411 (1%) Weston 618 (.5%) Tinuvin 292 (.5%) Irganox 1010 (0.2%) | 7400 |
| 41 | " | Resorcinol stabilizer (1%) Weston 618 (.5%) Irganox 1010 (0.2%) | 1300 |
| 42 | " | Resorcinol stabilizer (1%) Weston 618 (.5%) Tinuvin 770 (.5%) Irganox 1010 (0.2%) | 7400 |
| 43 | " | Resorcinol stabilizer (1%) Weston 618 (.5%) Tinuvin 292 (.5%) Irganox 1010 (0.2%) | 7400 |
| 44 | T(100)-EG(69)-CM-31 | None | <1000 |
| 45 | " | Cyasorb UV-5411 (1%) Weston 618 (.5%) Tinuvin 622 (.5%) | <1000 |
| 46 | " | Cyasorb UV-5411 (1%) Weston 618 (.5%) | <1000 |
| 47 | T(100)-CM-(59)-BO(30)-PTG(11) | Irganox 1010 (.5%) Weston 618 (.5%) Cyasorb UV-5411 (1%) Tinuvin 770 (.5%) | <3000 |
| 48 | C(100)-CM(100) | None | <500 |
| 49 | " | Cyasorb UV-5411 (1%) Weston 618 (.5%) | <500 |
| 50 | " | Cyasorb UV-5411 (1%) Weston 618 (.5%) Irganox 1010 (.2%) Tinuvin 770 (.5%) | <500 |

[g]C = 1,4-cyclohexanedicarboxylic acid (100% trans); see footnote b of Table I for additional monomer code definitions.
[h]Resorcinol stabilizer [UV stabilizer (3-hydroxyphenyl-4(2-benzoxazolyl)benzoate]; Tinuvin ® 292 [hindered amine stabilizer (bis(1,2,2,6,6-pentamethyl-4-piperidinyl)sebacate]; Tinuvin ® 770 [hindered amine stabilizer (bis(2,2,6,6-tetramethyl-4-piperidinyl) decanedioate] see footnote c of Table II for additional stabilizer information.

Unless otherwise specified all parts, percentages, ratios, etc. are by weight.

The invention has been described in detail with particular reference to preferred embodiments thereof, but it will be understood that variations and modifications can be effected within the spirit and scope of the invention.

We claim:

1. A highly weatherable copolyesterether composition having a 264 psi heat deflection temperature greater than 60° C. and an inherent viscosity of about 0.8 to about 1.5, said copolyesterether comprising
   A. a 100 mole % dicarboxylic acid component comprising about 80-100 mole % 1,4-cyclohexanedicarboxylic acid having a trans isomer content of at least 70% and about 0-20 mole % of a second acid selected from the group consisting of aliphatic dicarboxylic acids having 3 to 12 carbon atoms,
   B. a 100 mole % glycol component comprising about 70-95 mole % 1,4-cyclohexanedimethanol and about 5–30 mole % of a polyalkylene ether glycol having a molecular weight of about 600 to about 3000, C. a stabilizing effective amount of the combination of
1. at least one hindered phenolic antioxidant,
2. at least one ultraviolet light stabilizing compound compatible with said copolyesterether, and
3. at least one hindered amine light stabilizing compound having the formulae

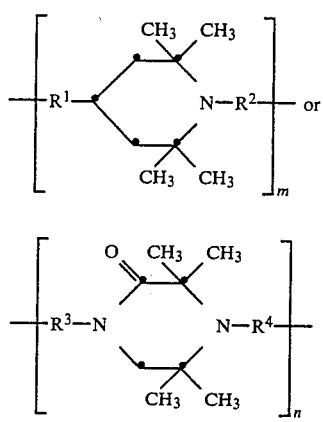

wherein m and n are each integers of from 1 to 20, $R^1$, $R^2$, $R^3$ and $R^4$ are each independently selected from hydrogen, substituted or unsubstituted alkyl having 1 to 20 carbon atoms, aryl having 6 to 22 carbon atoms, alkylene having 1 to 20 carbon atoms, cycloalkylene having 3 to 12 carbon atoms, hydroxyalkyl having 1 to 18 carbon atoms, and esters of said hydroxyalkyl; and alkylenecarboxylic acid having 2 to 18 carbon atoms and esters, amides and metal salts of said alkylenecarboxylic acid.

2. A copolyesterether composition according to claim 1 wherein said phenolic antioxidant is present in an amount of about 0.01 to about 1.0 weight %, said ultraviolet light stabilizing compound is present in an amount of about 0.05 to about 5.0 weight % and said hindered amine light stabilizing compound is present in an amount of about 0.05 to about 2.0 weight %, based on the weight of said copolyesterether.

3. A copolyesterether composition according to claim 1 wherein said ultraviolet light stabilizing compound is selected from the group consisting of a compound having the formula

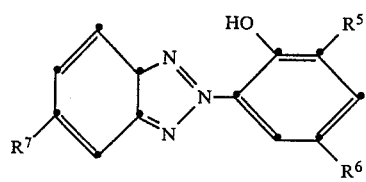

wherein $R^5$, $R^6$, and $R^7$ are each independently selected from hydrogen, hydroxyl, branched or unbranched, substituted or unsubstituted alkyl or alkoxy radicals containing from 1 to 18 carbon atoms, aryl, and alkylenearyl containing from 7 to 22 carbon atoms; $R^7$ is also chlorine or fluorine;

a compound having the formula

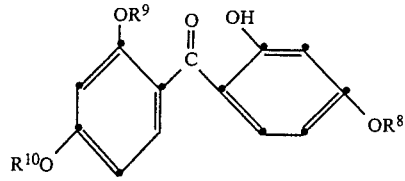

wherein $R^8$, $R^9$ and $R^{10}$ are each independently selected from hydrogen, branched or unbranched, substituted or unsubstituted alkyl having 1 to 18 carbon atoms, and alkylenecarbonyloxyalkyl having 3 to 18 carbon atoms;

a compound having the formula

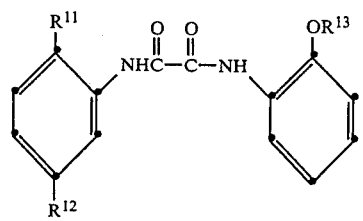

wherein $R^{11}$, $R^{12}$ and $R^{13}$ are each independently selected from hydrogen and substituted or unsubstituted, branched or unbranched alkyl radicals containing from 1 to 10 carbon atoms;

a compound of the formula

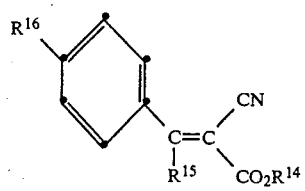

wherein $R^{14}$ and $R^{16}$ are each independently selected from substituted or unsubstituted alkyl containing from 1 to 18 carbon atoms, $R^{15}$ is hydrogen, methyl, or substituted or unsubstituted aryl having 6 to 22 carbon atoms, and $R^{16}$ is also substituted or unsubstituted alkoxy having 1 to 18 carbon atoms;

a compound having the formula

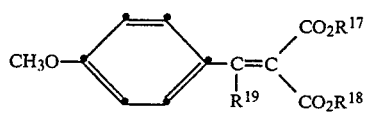

wherein $R^{17}$ and $R^{18}$ are each independently selected from substituted or unsubstituted, branched or unbranched alkyl having 1 to 18 carbon atoms and $R^{18}$ is hydrogen or methyl;

a compound having the formula

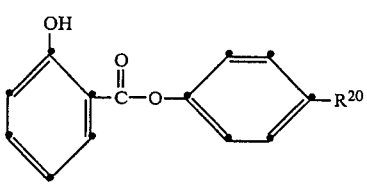

wherein R²⁰ is hydrogen, substituted or unsubstituted branched or unbranched alkyl or alkoxy having 1 to 18 carbon atoms.

4. A copolyesterether composition according to claim 1 wherein said acid component comprises about 80-100 mole % 1,4-cyclohexanedicarboxylic acid having a trans isomer content of at least 70% and about 0-20 mole % of a second acid selected from the group consisting of adipic acid, sebacic acid, glutaric and azelaic acid.

5. A copolyesterether composition according to claim 1 wherein said glycol component comprises about 70-95 mole % 1,4-cyclohexanedimethanol, about 5-30 mole % of a polyalkylene ether glycol and about 0-20 mole % of a third glycol selected from the group consisting of aliphatic glycols having 2 to 12 carbon atoms.

6. A copolyesterether composition according to claim 1 wherein said acid component comprises 1,4-cyclohexanedicarboxylic acid and a second acid selected from the group consisting of adipic acid, sebacic acid, glutaric acid, and azelaic acid, and said glycol component comprises 1,4-cyclohexanedimethanol, a polyalkylene ether glycol selected from the group consisting of polyethylene ether glycol, polypropylene ether glycol, and polytetramethylene ether glycol, and a third glycol selected from the group consisting of ethylene glycol, diethylene glycol, 1,4-butanediol and 1,6-hexanediol, wherein said alkylene ether glycols have a molecular weight of about 600 to about 3000.

7. A copolyesterether composition according to claim 1 wherein 1,4-cyclohexanedicarboxylic acid has a trans isomer content of about 85 to 95%.

8. A copolyesterether composition according to claim 1 wherein said phenolic antioxidant is selected from the group consisting of tetrakis[methylene(3,5-di-tert-butyl-4-hydroxyhydrocinnamate)methane], 1,3,5-tris(3,5-di-tert-butyl-4-hydroxybenzyl)-s-triazine-2,4,6-(1H, 3H, 5H)-trione; octadecyl 3,5-di-tert-butyl-4-hydroxyhydrocinnamate; and 1,6-hexamethylene-bis-(3,5-di-tert-butyl-4-hydroxyhydrocinnamate, said ultraviolet light stabilizing compound is selected from the group consisting of 2-[2-hydroxy-3,5-di(α,α-dimethylbenzyl)phenyl]-2H-benzotriazole, 2-ethoxy-2'-ethyloxanilide, and 2-ethylhexyl-2-cyano-3,3-diphenylacrylate, and said hindered amine light stabilizing compound is selected from the group consisting of bis-(1,2,2,6,6-pentamethyl-4-piperidinyl)sebacate, bis(1,2,2,6,6-pentamethyl-4-piperidinyl) 2-[[3,5-bis(1,1-dimethylethyl)-4-hydroxyphenyl]methyl]-2-butylpropanedioate, dimethylsuccinate polymer with 4-hyroxy-2,2,6,6-tetramethyl-1-piperidineethanol, and poly[(2,2,6,6-tetramethyl-4-piperidinyl)iminomethylene-2,2,6,6-tetramethyl-4-piperdinyl)imino[6-(octylamino)-1,3,5-triazine-4,2-diyl]].

9. A copolyesterether composition having a 264 psi heat deflection temperature greater than 60° C. and an inherent viscosity of from about 0.8 to about 1.5, said copolyesterether comprising A. a 100 mole % dicarboxylic acid component comprising about 80-100 mole % 1,4-cyclohexanedicarboxylic acid having a trans isomer content of at least 70% and about 0-20 mole % of a second acid selected from the group consisting of aliphatic dicarboxylic acids having 3 to 12 carbon atoms.

B. a 100 mole % glycol component comprising about 70-95 mole % 1,4-cyclohexanedimethanol and about 5-30 mole % of a polyalkylene ether glycol having a molecular weight of about 600 to about 3000, C. a stabilizing effective amount of the combination of
1. at least one hindered phenolic antioxidant,
2. at least one ultraviolet light stabilizing compound selected from the group consisting of a compound having the formula

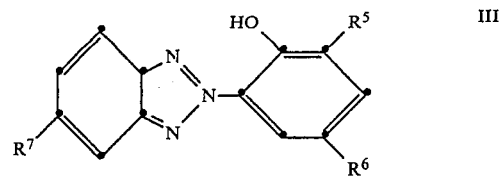

wherein R⁵, R⁶, and R⁷ are each independently selected from hydrogen, hydroxyl, branched or unbranched, substituted or unsubstituted alkyl or alkoxy radicals containing from 1 to 18 carbon atoms, aryl, and alkylenearyl containing from 7 to 22 carbon atoms; R⁷ is also chlorine or fluorine;

a compound having the formula

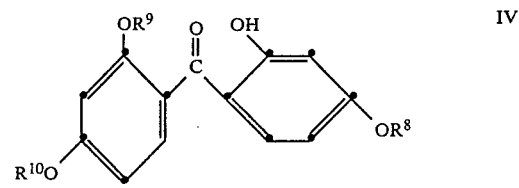

wherein R⁸, R⁹ and R¹⁰ are each independently selected from hydrogen, branched or unbranched, substituted or unsubstituted alkyl having 1 to 18 carbon atoms, and alkylenecarbonyloxyalkyl having 3 to 18 carbon atoms;

a compound having the formula

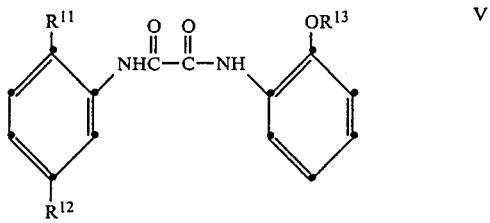

wherein R¹¹, R¹² and R¹³ are each independently selected from hydrogen and substituted or unsubstituted, branched or unbranched alkyl radicals containing from 1 to 10 carbon atoms;

a compound of the formula

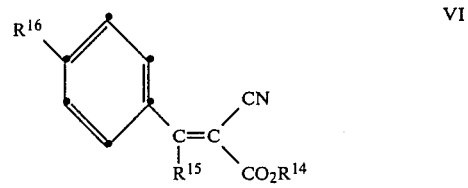

wherein R¹⁴ and R¹⁶ are each independently selected from substituted or unsubstituted alkyl containing from 1 to 18 carbon atoms, R¹⁵ is hydrogen, methyl, or substituted or unsubstituted aryl having 6 to 22 carbon atoms, and R¹⁶ is also substituted or unsubstituted alkoxy having 1 to 18 carbon atoms;

a compound having the formula

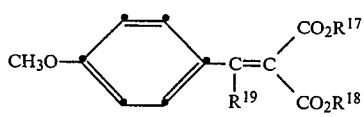

wherein $R^{17}$ and $R^{18}$ are each independently selected from substituted or unsubstituted, branched or unbranched alkyl having 1 to 18 carbon atoms and $R^{19}$ is hydrogen or methyl;

a compound having the formula

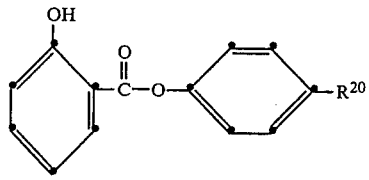

wherein $R^{20}$ is hydrogen, substituted or unsubstituted branched or unbranched alkyl or alkoxy having 1 to 18 carbon atoms, 3. at least one hindered amine light stabilizing compound having the formulae

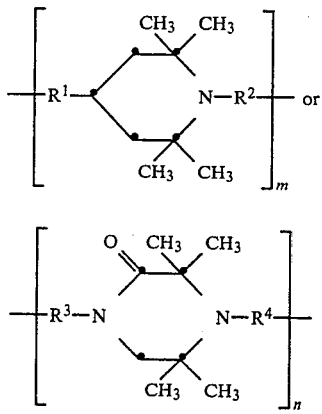

wherein m and n are each integers of from 1 to 20, $R^1$, $R^2$, $R^3$ and $R^4$ are each independently selected from hydrogen, substituted or unsubstituted alkyl having 1 to 20 carbon atoms, aryl having 6 to 22 carbon atoms, alkylene having 1 to 20 carbon atoms, cycloalkylene having 3 to 12 carbon atoms, hydroxyalkyl having 1 to 18 carbon atoms, and esters of said hydroxyalkyl; and alkylenecarboxylic acid having 2 to 18 carbon atoms and esters, amides and metal salts of said alkylenecarboxylic acid.

10. A copolyesterether composition according to claim 9 wherein said phenolic antioxidant is present in an amount of about 0.1 to about 0.5 weight %, said ultraviolet light stabilizing compound is present in an amount of about 0.5 to about 1.0 weight % and said hindered amine light stabilizing compound is present in an amount of about 0.25 to about 0.5 weight %, based on the weight of said copolyesterether.

11. A copolyesterether composition according to claim 9 wherein said acid component comprises about 80–100 mole % 1,4-cyclohexanedicarboxylic acid having a trans isomer content of at least 70% and about 0–20 mole % of a second acid selected from the group consisting of adipic acid, sebacic acid, glutaric and azelaic acid.

12. A copolyesterether composition according to claim 9 wherein said glycol component comprises about 85–95 mole % 1,4-cyclohexanedimethanol, about 5–15 mole % of a polyalkylene ether glycol and about 0–10 mole % of a third glycol selected from the group consisting of aliphatic glycols having 2 to 12 carbon atoms.

13. A copolyesterether composition according to claim 12 wherein 1,4-cyclohexanedimethanol has a trans isomer content of at least 60%.

14. A copolyesterether composition according to claim 9 wherein said acid component comprises 1,4-cyclohexanedicarboxylic acid and a second acid selected from the group consisting of adipic acid, sebacic acid, glutaric acid, and azelaic acid, and said glycol component comprises 1,4-cyclohexanedimethanol, a polyalkylene ether glycol selected from the group consisting of polyethylene ether glycol, polypropylene ether glycol, and polytetramethylene ether glycol, and a third glycol selected from the group consisting of ethylene glycol, diethylene glycol, 1,4-butanediol and 1,6-hexanediol, wherein said alkylene ether glycols have a molecular weight of about 800 to about 1200.

15. A copolyesterether composition according to claim 9 wherein 1,4-cyclohexanedicarboxylic acid has a trans isomer content of about 85 to 95%.

16. A copolyesterether composition according to claim 9 wherein said phenolic antioxidant is selected from the group consisting of pentaerythritol tetrakis(3,5-di-tert-butyl-4-hydroxyhydrocinnamate), 1,3,5-tris(3,5-di-tert-butyl-4-hydroxybenzyl)-s-triazine-2,4,6-(1H, 3H, 5H)-trione; octadecyl 3,5-di-tert-butyl-4-hydroxyhydrocinnamate; and 1,6-hexamethylene-bis(3,5-di-tert-butyl-4-hydroxyhydrocinnamate, said ultraviolet light stabilizing compound is selected from the group consisting of 2-[2-hydroxy-3,5-di($\alpha,\alpha$-dimethylbenzyl)phenyl]-2H-benzotriazole, 2-ethoxy-2'-ethyloxanilide, and 2-ethylhexyl-2-cyano-3,3-diphenylacrylate, and said hindered amine light stabilizing compound is selected from the group consisting of bis-(1,2,2,6,6-pentamethyl-4-piperidinyl)sebacate, bis(1,2,2,6,6-pentamethyl-4-piperidinyl) 2-[[3,5-bis(1,1-dimethylethyl)-4-hydroxyphenyl]methyl]-2-butylpropanedioate, dimethylsuccinate polymer with 4-hyroxy-2,2,6,6-tetramethyl-1-piperdineethanol, and poly[(2,2,6,6-tetramethyl-4-piperidinyl)iminomethylene-2,2,6,6-tetramethyl-4-piperdinyl)imino[6-(octylamino)-1,3,5-triazine-4,2-diyl]].

17. A copolyesterether composition having a 264 psi heat deflection temperature greater than 60° C. and an inherent viscosity of about 0.8 to about 1.5, said copolyesterether comprising A. a 100 mole % dicarboxylic acid component comprising about 80–100 mole % 1,4-cyclohexanedicarboxylic acid having a trans isomer content of at least 70% and about 0–20 mole % of a second acid selected from the group consisting of aliphatic dicarboxylic acids having 3 to 12 carbon atoms, B. a 100 mole % glycol component comprising about 85–95 mole % 1,4-cyclohexanedimethanol having a trans isomer content of at least 60% and about 5–15 mole % of a polyalkylene ether glycol having a molecular weight of about 800 to about 1200, C. the combination of about 0.1 to about 0.5 weight % pentaerythritol tetrakis(3,5-di-tert-butyl-4-hydroxyhydrocinnamate), about 0.5 to about 1.0 weight % 2-ethoxy-2'-ethyloxanilide, and about 0.25 to about 0.5 weight % of a polyester of succinic acid and N-β-hydroxyethyl-2,2,6,6-tetramethyl-4-hydroxypiperidine.

18. A molded article of manufacture produced from the copolyesterether composition according to claim 1.

19. A molded article of manufacture produced from the copolyesterether composition according to claim 9.

20. A molded article of manufacture produced from the copolyesterether composition according to claim 16.

21. An extrusion blow molded article of manufacture produced from the copolyesterether according to claim 1.

22. An extrusion blow molded article of manufacture produced from the copolyesterether according to claim 9.

23. An extrusion blow molded article of manufacture produced from the copolyesterether according to claim 16.

24. A film of the copolyesterether composition according to claim 1.

25. A film of the copolyesterether composition according to claim 9.

26. A film of the copolyesterether composition according to claim 16.

27. The method for stabilizing a copolyesterether composition having a 264 psi heat deflection temperature greater than 60° C. and an inherent viscosity of about 0.8 to about 1.5, said copolyesterether comprising a 100 mole % dicarboxylic acid component comprising about 80-100 mole % 1,4-cyclohexanedicarboxylic acid having a trans isomer content of at least 70% and about 0-20 mole % of a second acid selected from the group consisting of aliphatic dicarboxylic acids having 3-12 carbon atoms, a 100 mole % glycol component comprising about 70-95 mole % 1,4-cyclohexanedimethanol, and about 5-30 mole % of a polyalkylene ether glycol having a molecular weight of about 600 to about 3000, said method comprising the step of incorporating into said copolyesterether composition a stabilizing effective amount of the combination of 1. at least one hindered phenolic antioxidant,
2. at least one ultraviolet light stabilizing compound compatible with said copolyesterether, and
3. at least one hindered amine light stabilizing compound having the formulae

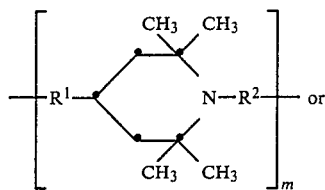

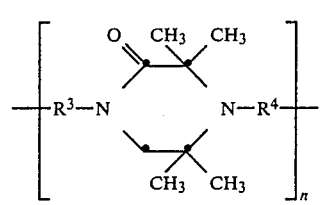

wherein m and n are each integers of from 1 to 20, $R^1$, $R^2$, $R^3$ and $R^4$ are each independently selected from hydrogen, substituted or unsubstituted alkyl having 1 to 20 carbon atoms, aryl having 6 to 22 carbon atoms, alkylene having 1 to 20 carbon atoms, cycloalkylene having 3 to 12 carbon atoms, hydroxyalkyl having 1 to 18 carbon atoms, and esters of said hydroxyalkyl; and alkylenecarboxylic acid having 2 to 18 carbon atoms and esters, amides and metal salts of said alkylenecarboxylic acid.

* * * * *